Figure 1:
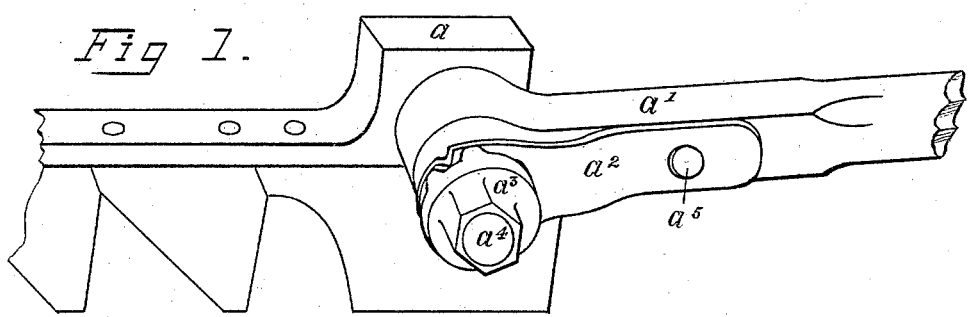

(No Model.)

W. N. WHITELEY.
PITMAN CONNECTION FOR KNIFE HEADS.

No. 426,485. Patented Apr. 29, 1890.

Witnesses.
William F. Devitt
Robert Weiskotten

Inventor
William N. Whitely

UNITED STATES PATENT OFFICE.

WILLIAM N. WHITELEY, OF SPRINGFIELD, OHIO.

PITMAN-CONNECTION FOR KNIFE-HEADS.

SPECIFICATION forming part of Letters Patent No. 426,485, dated April 29, 1890.

Application filed January 8, 1890. Serial No. 336,241. (No Model.)

*To all whom it may concern:*

Be it known that I, WILLIAM N. WHITELEY, a citizen of the United States, residing at Springfield, in the county of Clark and State of Ohio, have invented a new and useful Improvement in a Pitman-Connection for Knife-Heads, of which the following is a specification.

My invention relates to improvements in pitman-connections to harvester knife-heads; and the objects of my improvement are, first, to provide means to keep the nut from being turned by the motion of the machine, and yet be easy to turn by the operator in adjusting the pitman to the knife-head; second, to provide a means to keep the bolt that connects and holds the knife-head and pitman together from turning, and, third, to automatically take up the wear of the pitman and knife-head joint and keep the two parts in close working connection all the time.

The pitman and knife-head may be connected by any well-known mechanical device including a conical or ball joint. I prefer to make it, as shown in the drawings, with the ball-cone upon the pitman and fitted into a socket in the knife-head; but the positions could be reversed and not escape my invention, or a regular cone could be attached to either pitman or to the knife-head and a socket be made in the other and still be within the limits of my invention. I prefer to use a ball joint for many reasons, the principal one being its flexibility and adaptability to the varying positions of the cutter-bar while the machine is in motion. In order to hold the pitman and the knife-head together, I employ a screw-threaded bolt and a nut fitted thereto, said bolt passing through the two parts. The bolt must be prevented from turning by being held in one of the two members, which can be done by any well-known method. I prefer to make the bolt square, fitting into a corresponding hole in the conical end of the pitman. The bolt being square prevents its turning, yet allows a sliding movement when adjusting the pitman and knife-head in working position. I attain these objects by the mechanism illustrated in the accompanying drawings, in which—

Figure 2:
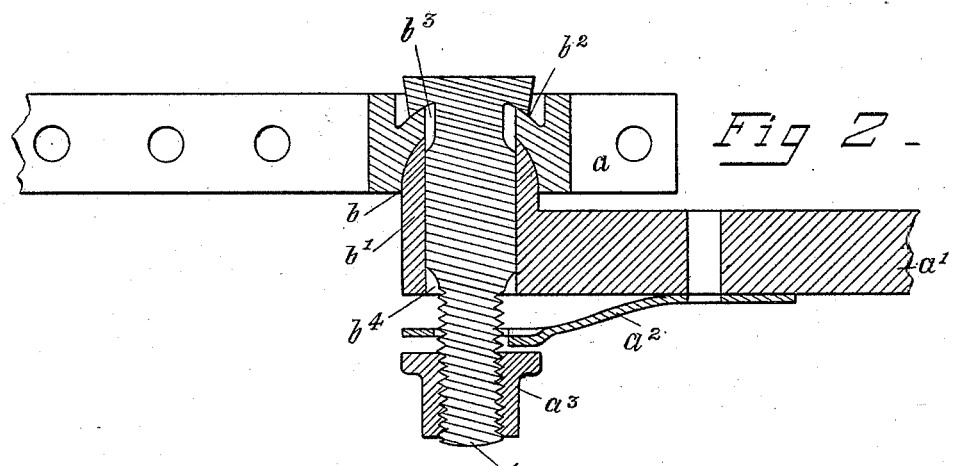
Figure 3:
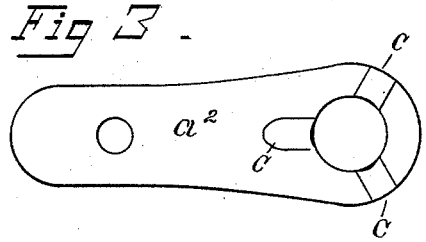
Figure 4:
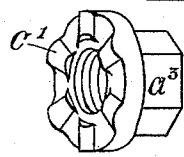

Figure 1 is a view of a part of the pitman and knife, showing the parts placed together in working position. Fig. 2 is a sectional view of the same, showing the joint, the position of the bolt, spring, and nut, and their relation thereto. Fig. 3 is a detail view of the spring, showing the raised lugs thereon to fit the ratchet-face of the nut. Fig. 4 is a view of the nut showing its ratchet-face.

Similar letters refer to similar parts throughout the several views.

$a$ is the knife-head. $a'$ is the pitman. $a^2$ is the spring. $a^3$ is the nut. $a^4$ is the bolt.

The socket $b$ and ball-cone $b'$ fit together, as shown in Fig 2. The bolt $a^4$ has a recessed head to fit formation $b^2$ in knife-head. The aperture $b^3$ in knife-head I make round, and the aperture $b^4$ in the pitman-cone I make square, the bolt $b^4$ being made square to fit therein, the object of which is to keep the bolt from turning. While I prefer to make the bolt and aperture square, I do not confine myself to that special manner of accomplishing that result. A round bolt and round aperture, with a spline on the bolt and a groove in the pitman-cone, would answer, or any well-known device might be used for the same purpose. The spring $a^2$ is fixedly attached to the pitman. I use a rivet $a^5$. Said spring $a^2$ is made with lugs $c$, which fit the ratchet-face $c'$ of the nut $a^3$. The bolt $a^4$ passes through the aperture in the knife-head and pitman-cone and through an aperture in the end of spring $a^2$, when the nut $a^3$ is run down upon the bolt until the knife-head and pitman are drawn together, and presses on the spring with sufficient force to keep the joint together and automatically take up any wear of the joint caused by the motion of the machine. The lugs or raised places on the spring, acting against the ratchet-face of the nut, keep it from being turned by the motion of the machine when adjusted and at work.

I am aware that prior to my invention knife-head pitman-connections have been made with springs to keep the joints snugly together and to automatically take up the wear of said joint—for instance, as shown in the patent granted S. J. Green, July 25, 1871; but I believe I am the first to use a threaded bolt that is made so as to be held from turning by either the knife-head or pitman, so that the nut can be turned to adjust the joint in working order without holding the bolt or without holding the ratchets apart, and yet the nut will not turn when the machine is in motion and at work. I therefore do not claim such a combination broadly; but What I do claim as my invention, and desire to secure by Letters Patent, is—

1. The combination, substantially as hereinbefore set forth, in a pitman-connection for harvester knife-heads, of a conical socket upon one member thereof and a corresponding fitting cone upon the other member, a screw-threaded bolt passing through each and through the ratchet-faced end of a flat spring that assists to keep the joint tight, its opposite end rigidly attached to the pitman-rod, and a ratchet-faced nut upon the screw-threaded bolt, which tightens and holds the two members together in working position, the ratchet-faced end of the spring acting against the face of the nut to prevent it from unscrewing by use.

2. In a pitman-connection for harvester knife-heads, the combination of the conical socket upon one member and a correspondingly-fitting cone upon the other, a screw-threaded bolt which passes through each and is fitted in either the pitman or knife-head to keep it from turning, a ratchet-faced nut fitted to the screw-threaded bolt, which tightens and holds the two members in working position, and the flat spring ratchet-faced at one end, which keeps the joint closely together and prevents the ratchet-nut from turning when in use and adjusted to its working position, substantially as described.

In witness whereof I hereunto set my hand and seal this the 27th day of December, 1889.

WILLIAM N. WHITELEY. [L. S.]

In presence of—
WILLIAM F. BEVITT,
ROBERT WEISKOTTEN.